United States Patent [19]
Terry et al.

[11] 3,769,050
[45] Oct. 30, 1973

[54] SILICATE PAINTS
[75] Inventors: Colin Alfred Terry, Baughurst; Peter Walker, Burghfield Common, both of England
[73] Assignee: United Kingdom Atomic Energy Authority, London, England
[22] Filed: Feb. 12, 1971
[21] Appl. No.: 115,055

[30] Foreign Application Priority Data
Feb. 12, 1970  Great Britain ..................... 6,826/70

[52] U.S. Cl. .................................. 106/84, 106/296
[51] Int. Cl. ............................................... C09d 1/02
[58] Field of Search ............................. 106/84, 296; 423/622

[56] References Cited
UNITED STATES PATENTS
3,100,154  8/1963  Oshima et al. ....................... 106/84
1,924,872  8/1933  Mason ................................. 106/296
1,997,925  4/1935  Eide ..................................... 106/296

*Primary Examiner*—James E. Poer
*Attorney*—Larson, Taylor & Hinds

[57] ABSTRACT

A thermal shock-resistant zinc oxide-pigmented silicate paint comprising zinc oxide pigment admixed with a silicate solution, preferably an aqueous alkali silicate solution, is rendered shock-resistant by heat-treating the zinc oxide powder - generally obtained as "zinc white" when Zn fumes are condensed in air or $O_2$ - prior to admixture of the powder with the silicate solution. The preferred heat treatment, in the range 600–900°C, produces pigment powder having a particle size distribution ranging from 0.1–1.0 microns up to 0.5–3.0 microns.

7 Claims, No Drawings

SILICATE PAINTS

BACKGROUND OF THE INVENTION

This invention relates to thermal shock-resistant paints and, in particular, to shock-resistant zinc oxide-pigmented silicate paints, and to a process for improving the thermal shock-resistance of zinc oxide-pigmented silicate paint.

The use of ZnO powder as a pigment in paints is well established and silicate solutions, in particular alkali silicate solutions, are established as suitable paint vehicles. ZnO powder, often referred to as 'zinc white' is formed, in one widely used method, when zinc metal is boiled in air, or other suitable oxygen-rich atmosphere, and the arising fumes are condensed. It has been found that silicate solutions pigmented with ZnO can form crack-free coatings on curing at a pigment loading of ≈40 percent by vol. but that higher loadings almost invariably lead to crazing and/or cracking on curing. Moreover after repeated thermal shock the adhesion of pigment-loaded paint and, in particular, paint with high pigment loadings eg 70 percent PVC (pigment volume concentration) tends to decrease drastically. The inadequate resistance to thermal shock apparent when the paint is applied to certain substrates can be partially alleviated by the prior application of certain organic primers which improve adhesion: however primer coatings do not alleviate the distinct tendency of high pigment-loaded paints to crack on curing.

It is an object of the present invention to provide a silicate paint having a high zinc oxide pigment loading which can form cured coatings the tendency of which to crack on curing and to lose adherence on thermal cycling is substantially diminished.

SUMMARY OF THE INVENTION

The present invention provides a thermal shock-resistant silicate paint comprising heat-treated zinc oxide powder, as a pigment, admixed with a silicate solution, as a vehicle.

The silicate solution may be an aqueous solution of an alkali silicate. The preferred alkali silicate is potassium silicate. The preferred heat treatment produces a pigment powder having a particle size distribution ranging from 0.1–1.0 microns up to 0.5–3.0 microns.

A further aspect of the invention is a process for making a pigmented silicate paint having improved thermal shock resistance and comprising zinc oxide pigment admixed with a silicate solution, as vehicle, wherein the zinc oxide, as condensed powder, is heat-treated prior to admixture with the vehicle.

As stated heretofore the silicate solution may be an aqueous solution of an alkali silicate and the heat-treatment preferably produces pigment having a particle size distribution ranging from 0.1–1.0 microns up to 0.5–3.0 microns. The pigment powder may be heated at a temperature in the range 600°–900°C and, preferably, at 800°C.

DESCRIPTION OF THE PREFERRED EMBODIMENTS

To further explain the nature of the present invention, by way of example, samples of zinc oxide condensed powder were first heat-treated in air as set forth in the following schedule (Table 1) and were then mixed with aqueous potassium silicate to a constant PVC of 70 percent, the silicate paints thereby formed being evaluated as coatings on aluminium or primer-coated aluminium surfaces.

Table 1
Schedule of Heat Treatments of ZnO and Evaluation of the corresponding ZnO-pigmented silicate paints at 70% PVC applied to primed and non-primed aluminium surfaces

| Heat Treatment (in air) | Substrate | Before Thermal Shock | | | | |
|---|---|---|---|---|---|---|
| | | Appearance | Scratch gms. | Bend in. | Adhesion psi | Site of Failure |
| ½ Hour at 800°C | Aluminium *Primer-coated | Smooth even coating free from cracks " " " " " " | 1400 1300 | Failed ½ Failed ½ | 2650 2760 | 100% A/S 80% A/P |
| Hour at 800°C | Aluminium *Primer-coated | Smooth even coating free from cracks " " " " " " | 1200 1300 | Failed ½ Failed ½ | 2920 3130 | 100% A/S 30% A/P |
| 2 Hours at 800°C | Aluminium *Primer-coated | Smooth even coating free from cracks " " " " " " | 2000 1800 | Failed ½ Failed ½ | 2700 3300 | 100% A/S 30% A/P |
| 5 Hours at 800°C | Aluminium *Primer-coated | Smooth even coating free from cracks " " " " " " | 2200 2500 | Failed ½ Failed ½ | 2630 2950 | 100% A/S 40% A/P |
| 6 Hours at 600°C | Aluminium *Primer-coated | Smooth even coating free from cracks " " " " " " | 1600 1100 | Failed ½ Failed ½ | 1970 2250 | 100% A/S 40% A/P |
| 22 Hours at 600°C | Aluminium *Primer-coated | Smooth even coating free from cracks " " " " " " | 1500 2100 | Failed ½ Failed ½ | 2620 3210 | 100% A/S 50% A/P |
| 24 Hours at 850°C | Aluminium *Primer-coated | Smooth even coating free from cracks " " " " " " | 2000 2000 | Failed ½ Failed ½ | 1800 2300 | 100% A/S 60% A/P |

Table 1.—Continued

| Heat Treatment (in air) | Substrate | Appearance | Scratch gms. | Bend in. | Adhesion psi | Site of Failure |
|---|---|---|---|---|---|---|
| ½ Hour at 800°C | Aluminium | Smooth even coating, slight cracking at edges | 1400 | Failed | 1930 | 100% A/S |
| | *Primer-coated | Smooth even coating, slight cracking at edges | 1300 | Failed | 2310 | 90% A/S |
| Hour at 800°C | Aluminium | Smooth even coating, very slight cracking at edges | 1100 | Failed | 2330 | 100% A/S |
| | *Primer-coated | Smooth even coating, very slight cracking at edges | 1000 | Failed | 2620 | 100% A/P |
| 2 Hours at 800°C | Aluminium | Smooth even coating very slight cracking at edges | 1000 | Failed | 1990 | 100% A/S |
| | *Primer-coated | Smooth even coating, very slight cracking at edges | 1200 | Failed | 2700 | 100% A/P |
| 5 Hours at 800°C | Aluminium | Smooth even coating, very slight cracking at edges | 2100 | Failed | 1760 | 100% A/S |
| | *Primer-coated | Smooth even coating, slight cracking at edges | 2000 | Failed | 2160 | 100% A/P |
| 6 Hours at 600°C | Aluminium | Smooth even coating, but small cracks overall | 1500 | Failed | 1710 | 100% A/S |
| | *Primer-coated | Smooth even coating, no visible cracks | 1100 | Failed | 1530 | 100% A/P |
| 22 Hours at 600°C | Aluminium | Smooth even coating, slight cracking at edges | 1500 | Failed | 2100 | 100% A/S |
| | *Primer-coated | Smooth even coating, very slight cracking at edges | 1600 | Failed | 2460 | 100% A/P |
| 24 Hours at 850°C | Aluminium | Smooth even coating, very slight cracking at edges | 1200 | Failed | 1200 | 100% A/S |
| | *Primer-coated | Smooth even coating, very slight cracking at edges | 1300 | Failed | 1650 | 80% A/P |

*the primer-coating for these results was an epoxide-aluminium primer-coating
A/S adhesion to substrate
A/P adhesion to primer The zinc oxide condensed powder produced to British Pharmacopia standard had a surface area of 3.5–4.2 m²/gm and a particle size in the range 0.25–0.30 microns. The aqueous potassium silicate solution had a SG at 20°C of 1.25, a $SiO_2:K_2O$ weight ratio of 2.23, a $SiO_2:K_2O$ molecular ratio of 3.50 and a silicate solids content of 28.4 percent.

Each sample of zinc oxide powder was milled for 4 hours with the entire amount of silicate solution required for a PVC of 70 percent. The milling was performed in porcelain mills using a steatite grinding charge. The paints so produced were applied, by spraying, to aluminium and primer-coated aluminium panels.

The application of silicate paints to certain substrate surfaces may be troublesome due to non-wetting and the consequent lack of adhesion. Such surfaces can be pre-coated with a suitable primer. Clear organic lacquers adhere well to most surfaces but the adhesion of superimposed coatings of zinc oxide-silicate paint is not satisfactory unless the lacquers are loaded with a suitable pigment eg Al powder, ground glass, glass as ballotini or as microspheres in a range of particle sizes. The use of high loadings of such inorganic fillers forms primers more nearly matching the expansion characteristics of the inorganic silicate coatings superimposed thereon so that resistance to thermal shock is enhanced. Suitable lacquers include polyamide cured epoxide resins, adduct cured epoxide resins and aliphatic isocyanate adduct polyesters.

Aluminium panels (6 inches × 4 inches) were selected for evaluating silicate paints, according to the invention, both with and without primer coatings. Some panels were coated with Al and glass loaded primers, based on polyamide - and adduct - cured epoxide vehicles: these panels were intially degreased and a single coat applied by spraying (to a dry film thickness of 2–3 mils). After≈14 days cure at room temperature and humidity the primed panels were abraded with a nylon scouring pad under running water and coated, by spraying, with ZnO pigmented silicate paint to a dry film thickness of 5–6 mils, a further 14 days being allowed for cure of the silicate paint at room temperature and humidity. Other Al panels were solvent degreased and abraded under running water and then sprayed with ZnO pigmented silicate paint to a dry film thickness of 5–6 mils followed by room temperature cure for 14 days.

In addition to the evaluation of silicate painted surfaces related to and disclosed with the afore listed schedule of Heat Treatment further Al panels were coated with aluminium- and glass-loaded primers to determine the panel adhesion of cured primer coatings only. The adhesion values shown in the following Table were obtained.

Table 2 Adhesion measurements on Loaded Organic Primers

| Primer | Adhesion (p. 31) | Site of Failure |
|---|---|---|
| Polyamide/Epoxide/Glass | 1800 | Cohesion within primer* |
| Polyamide/Epoxide/Aluminium | 2100 | " |
| Adduct/Epoxide/Glass | 3580 | " |
| Adduct/Expoxide/Aluminium | 3790 | " |

* adhesive strength exceeded cohesive strength

The above typical adhesion values are considered to be adequate, as the adhesion values obtained were generally in the region of or in excess of 2,000 psi with some above 3,000 psi. Adhesion in psi (tables 1 and 2) was measured by a torque spanner technique (see Journal of Oil and Colour Chemists Assoc. 47 Oct. 10, 1964).

The $SiO_2:K_2O$ ratio in potassium silicate is not critical and does not substantially influence the adhesion of coatings or the resistance to thermal shock. Typical potassium silicate solutions suitable for use in the invention have the following properties:

TABLE 3

|  |  |  |  |  |  |  |
|---|---|---|---|---|---|---|
| SG at 20°C | 1.600 | 1.408 | 1.330 | 1.380 | 1.265 | 1.250 |
| Mean weight ratio, $SiO_2:K_2O$ | 1.43 | 2.01 | 2.05 | 2.14 | 2.48 | 2.23 |
| Mean molecular ratio, $SiO_2:K_2O$ | 2.24 | 3.15 | 3.21 | 3.35 | 3.89 | 3.50 |
| Silicate solids (percent) | 52.4 | 1.1 | 34.8 | 39.1 | 29.9 | 28.4 |

The ZnO-silicate paints at 70 percent PVC applied to Al panels, with and without primer coatings, were subjected to continuous thermal cycling by exposing each painted panel to 1,000 thermal cycles over 20 days, each cycle extending from − 80°C to + 80°C. A bend test and a scratch resistance test were applied to the painted panels, in addition to the adhesion test: these tests were conducted on i) cured panels and ii) cured and thermally cycled panels. The results are presented in Table 1. The bend test was performed according to DEF 1053 method 13: panels were deemed to have passed the test if the coatings were still adherent (although showing cracking). The scratch resistance test was performed according to DEF 1053 method 14 (using the Sheen automatic scratch test apparatus). The scratch resistance was measured as the highest needle loading before the substrate or primer coating was exposed.

In addition to potassium silicate solution vehicles solutions of lithium silicate can be used. Sodium silicate paints suffer the drawback that, with ageing, they exhibit sweating and efflorescence. Other silicate solutions which can be used include those of ethyl silicate and quarternary ammonium silicate.

Zinc oxide condensed powder contains a wide range of particle sizes the particles having a substantially uniform rectangular shape with sharp edges. Electron micrographs reveal that the heat treatment, in increasing particle size, substantially increases the particle size of the smaller size fractions so that the range of particle sizes is narrowed. Apart from a larger and more uniform particle size heat-treated particles tend to assume a spherical shape with loss of the sharp edges. It is believed that the change in form of zinc oxide powder on heat treatment may be responsible for the much improved behaviour of ZnO-pigmented silicate paints, both on cure and after thermal shock (see Table 1). None of the silicate coatings of Table I showed cracking on cure and they all showed good adhesion, irrespective of the particular heat treatments eg only 30 mins at 800°C or 6 hours at only 600°C, either corresponding to an approx. particle size distribution ranging from 0.1–1.0 microns.

All the paints were applied by spraying without any special precautions being taken either on spray technique or subsequent cure. The results show that thermal shock had only a minor effect on the coatings, the scratch resistance and adhesion values remaining relatively high. Although the particle size increases with the severity of the heat treatment, with a loss of the finer particles and a definite change of shape, the rounding of the particles due to heat treatment is not directly related to the rate of grain growth as the pigment obtained from heating at 600°C for 6 hours appears, from electron micrographs, to be more rounded, although of the same size, as that heated for one-half hour at 800°C. It is believed that the crack-free property conferred by heat-treated ZnO is at least partly due to the rounding of the particle rather than just an increase in particle size.

It was observed that zinc oxide became progressively yellower as the heat treatment became more severe until after 22 hours at 850°C a cream coloured pigment was produced. The treatment involving heating in air at 800°C for 1 hour is one suitable heat treatment as this produces a pigment of good white appearance and high reflectance: in addition this heat treatment does not produce hard ZnO aggregates and ball-milling for 1–2 hours can produce a paint with adequate dispersion of the pigment.

We claim:

1. A thermal shock-resistant silicate paint, curable at room temperature in air, without cracking or crazing, comprising heat-treated zinc oxide powder, as a pigment, admixed with a silicate solution, as a vehicle, wherein the pigment powder has been heat-treated at a temperature in the range of 600–900°C to provide zinc oxide powder of rounded shape having a particle size range narrowed by said heat treatment to a particle size distribution ranging from 0.1–1.0 microns up to 0.5–3.0 microns, the zinc oxide pigment volume concentration of said silicate paint being higher than about 40.

2. A silicate paint as claimed in claim 1 wherein the silicate solution is an aqueous solution of an alkali silicate.

3. A silicate paint as claimed in claim 1 wherein the pigment powder has been heat-treated at approximately 800°C.

4. A silicate paint as claimed in claim 2 wherein the alkali silicate is potassium silicate.

5. A silicate paint as claimed in claim 4 wherein the pigment powder has been heat-treated at approximately 800°C.

6. A silicate paint as claimed in claim 1 wherein the pigment volume concentration is approximately 70 percent.

7. A silicate paint as claimed in claim 5 wherein the pigment volume concentration is approximately 70 percent.

* * * * *